United States Patent [19]

Murata et al.

[11] Patent Number: 4,897,864
[45] Date of Patent: Jan. 30, 1990

[54] CONTROL METHOD AND APPARATUS FOR A RADIO TELEPHONE SYSTEM

[75] Inventors: Yoshitoshi Murata, Yokosuka; Kazuhiro Yoshizawa, Kashiwa; Akio Yotsutani, Tokyo; Koichi Ito, Hino, all of Japan

[73] Assignees: Nippon Telegraph and Telephone Corp.; NEC Corp., both of Tokyo; Kabushiki Kaisha Toshiba, Kanagawa, all of Japan

[21] Appl. No.: 178,844

[22] Filed: Apr. 7, 1988

Related U.S. Application Data

[63] Continuation of Ser. No. 900,620, Aug. 26, 1986, abandoned.

[30] Foreign Application Priority Data

Aug. 27, 1985 [JP] Japan .................................. 60-187761

[51] Int. Cl.$^4$ .............................................. H04Q 7/04
[52] U.S. Cl. .......................................... 379/61; 379/63
[58] Field of Search ....................... 379/61, 62, 63, 58, 379/56

[56] References Cited

U.S. PATENT DOCUMENTS

| | | | |
|---|---|---|---|
| 3,586,978 | 6/1971 | Gorder | 371/61 |
| 4,628,152 | 12/1986 | Åkerberg | 379/61 |
| 4,640,987 | 2/1987 | Tsukada et al. | 379/62 |
| 4,650,931 | 3/1987 | Tsukada et al. | 379/61 |
| 4,672,658 | 6/1987 | Kavehrad | 379/63 |
| 4,706,274 | 11/1987 | Baker et al. | 379/61 |
| 4,741,019 | 4/1988 | Takahashi | 379/61 |

FOREIGN PATENT DOCUMENTS

| | | | |
|---|---|---|---|
| 0011605 | 1/1979 | Japan | 379/61 |
| 0011606 | 1/1979 | Japan | 379/61 |
| 0210737 | 12/1982 | Japan | 379/61 |
| 0206244 | 12/1983 | Japan | 379/61 |

Primary Examiner—Robert Lev
Attorney, Agent, or Firm—Finnegan, Henderson, Farabow, Garrett and Dunner

[57] ABSTRACT

A method and apparatus for controlling a radio telephone system wherein a speech channel is established between one radio telephone handset out of a plurality of radio telephone handsets and a base unit. An interphone switch for selecting intercom communication is provided for respective radio telephone handsets. The transmitters of the radio telephone handsets are turned OFF when the intercom switch is OFF, and transmitters of the radio telephone handsets are turned ON when the intercom switch is ON. Consequently the connection between a wired telephone channel and the plurality of radio telephone handsets can be controlled with a single base unit connected to the wired telephone channel.

21 Claims, 6 Drawing Sheets

CONTROL METHOD AND APPARATUS FOR A RADIO TELEPHONE SYSTEM

This application is a continuation of application Ser. No. 900,620, filed Aug. 26, 1986, now abandoned.

BACKGROUND OF THE INVENTION

1. Field of the Invention

This invention relates to a radio telephone system control apparatus and a method for controlling the connection of a base unit connected to a wired telephone channel and a plurality of radio telephone handsets connected to the base unit through radio channels base unit, and more particularly an apparatus for controlling an intercom connection among a plurality of the radio telephone handsets.

2. Description of the Related Arts

Radio telephone systems comprise a base unit connected to wired telephone lines and one or more radio telephone handsets connected to the base unit through radio channels, such as a cordless telephone. The cordless telephone apparatus consists of a base unit connecting apparatus connected to wired telephone channels, and a radio telephone handset provided for the base unit in a one to one correspondence, and the frequencies of its signals are fixed such that up radio channels from the radio telephone handsets to the base unit utilize signals of frequency $f_1$, while down telephone channels from the base unit to the radio telephone handsets utilize signals of frequency $f_2$. As a consequence, where two radio telephone handsets are utilized, it is necessary to install two base units.

With such a radio telephone system utilizing two radio telephone handsets and two base units, however, two radio telephone handsets are not usually used simultaneously, so that provision of two base units is not economical.

In recent years, for the purpose of efficiently utilizing allocated frequencies, a so-called multi-channel access system has been adopted wherein a frequency being used is determined by utilizing a common channel, for example, a control channel between a plurality of base units, and then the channel is switched to a speech channel corresponding to the frequency. However, when such a multi-channel access system is adopted, there is a problem in the case where a base unit is provided for each of the two radio telephone handsets that when a ring signal is received from a wired telephone handset, the two base units start connection control using respective control channels simultaneously, whereby radio waves from these control channels interfere with each other. Thus, the connection control is sometimes made impossible.

SUMMARY OF THE INVENTION

It is therefore an object of this invention to provide a radio telephone system control apparatus and a method which enables connection control for a plurality of radio telephone handsets with a single base unit as well as to provide an intercom function.

According to one aspect of this invention, there is provided a radio telephone system control apparatus comprising a plurality of radio telephone handsets, each having a handset transceiver; a base unit connected to a wired telephone channel for exchanging signals between said base unit and the handset transceiver of said radio telephone handsets; means for establishing a speech channel between the said plurality of radio telephone handsets and a base unit transceiver intercom switch means provided for respective radio telephone handsets for selecting an intercom performance; means for turning OFF a transmitter of a radio telephone handset provided with said intercom switch means when said intercom switch means is OFF; and means for turning ON a transmitter of a radio telephone handset provided with said intercom switch means when the same is turned ON.

According to a modified embodiment of this invention, there is provided a method of controlling a radio telephone system of the type wherein connections between a wired telephone channel and a plurality of radio telephone handsets are controlled by a single base unit connected to said wired telephone channel, said method comprising the steps of: establishing a speech channel between said plurality of radio telephone handsets and a base unit; providing an intercom switch for respective radio telephone handsets to select intercom performances; turning OFF of the transmitter of said radio telephone handsets when the intercom switch is OFF, and turning ON the transmitter of the radio telephone sets when said intercom switch is ON.

DESCRIPTION OF THE PREFERRED EMBODIMENT

Figure 1:
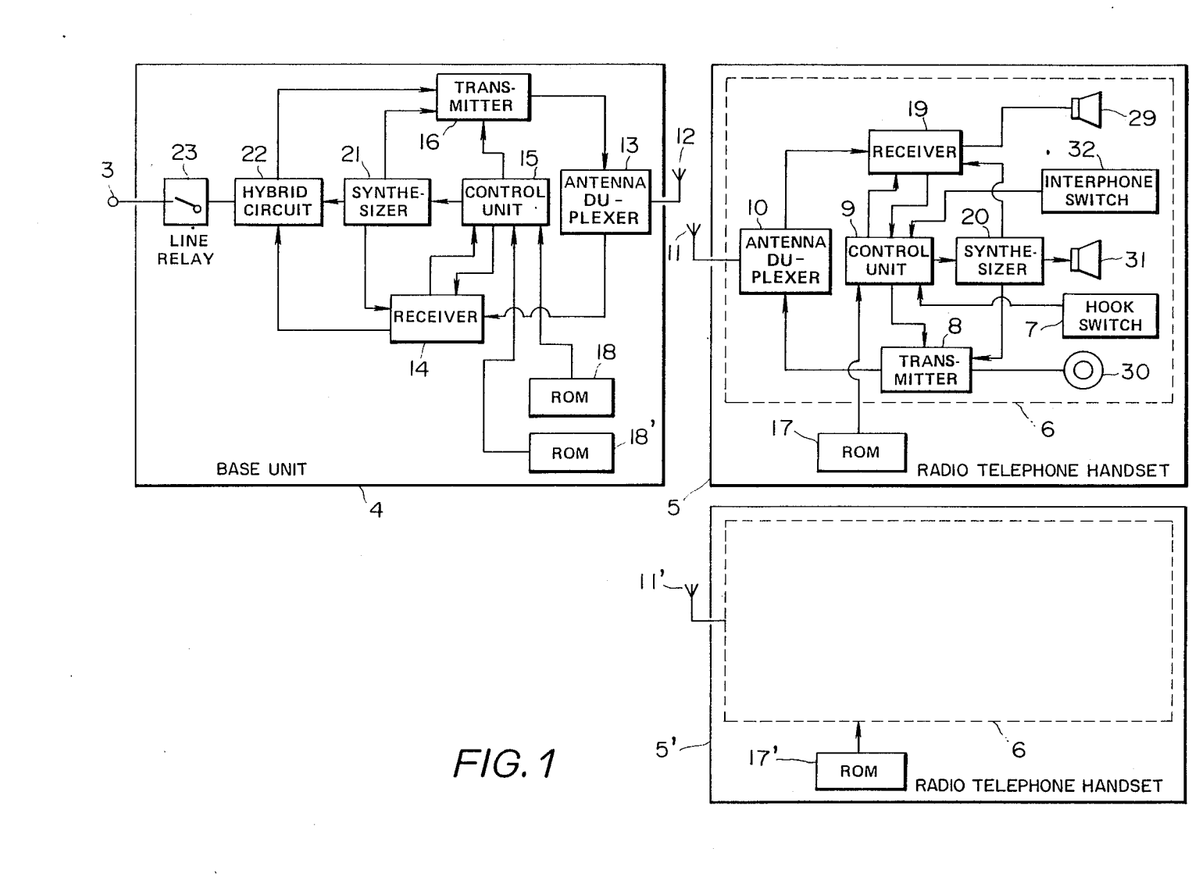
FIG. 1 is a block diagram showing the detail of one embodiment of this invention.

A preferred embodiment of the radio telephone system according to this invention shown in FIG. 1 comprises one base unit 4 and two radio telephone handsets 5 and 5'. For the purpose of simplifying the description, only two radio telephone handsets are shown but it will be clear that the invention is also applicable to three or more radio telephone handsets. The base unit 4 is connected to a wired telephone line, not shown, through a terminal 3. A signal from the wired telephone line inputted to terminal 3 is supplied to a transmitter 16 via a line relay 23 and a hybrid circuit 22, while the output from the transmitter 16 is sent out from an antenna 12 via an antenna duplexer 13. On the other hand, a signal received by antenna 12 is applied to a receiver 14 through antenna duplexer 13, and the output from the receiver 14 is supplied to the wired telephone line via hybrid circuit 22, line relay 23 and terminal 3. A synthesizer 21 is provided for determining the radio frequency of the transmitter 16 and the receiver 14, and a control unit 15 is provided for the purpose of controlling transmitter 16, receiver 14 and synthesizer 21. Read only memory devices (ROM) 18 and 18' are provided for the purpose of storing identification information for controlling the connections to radio telephone handsets to be described later, the Identification information being used in the control unit 15.

The radio telephone handsets 5 and 5' are connected to the base unit through radio channels. The wireless telephone sets 5 and 5' have the same construction except that their ROMs 17 and 17' store different information. More particularly, element 6 bounded by dotted lines in FIG. 1 has the same construction for both telephone sets 5 and 5' so that in the following description, elements utilized in radio telephone handset 5' are designated by the same reference numerals as those used in the radio telephone handset 5 except addition of a prime. The signal transmitted from the base unit is received by an antenna 11 and applied to a receiver 19 through an antenna duplexer 10, and the output of the receiver 19 is supplied to a loudspeaker 29 to be connected to generate sound. A signal inputted to a microphone 30 is sent to the base unit 4 via transmitter 8, antenna duplexer 10, and antenna 11. A synthesizer 20 is provided for determining the radio frequency of receiver 19 and transmitter 8, while a control unit 9 is provided for controlling receiver 19, transmitter 8 and synthesizer 20. A loudspeaker 31 connected to the synthesizer produces a call tone. A hook switch 7 is provided to originate a call and to respond to the call tone produced by the loudspeaker 31.

The information stored in ROMs 17 and 17′ corresponds to that stored in ROMs 18 and 18′ of the base unit 4.

This embodiment employs a multichannel access system comprising a single control channel (C-CH) and a plurality, for example 45, of speech channels. Thus a speech channel is established by commonly utilizing a single control channel by a plurality of apparatus. The operation of this embodiment will be described with reference to the flow charts shown in FIGS. 2 through 6.

Figure 2:
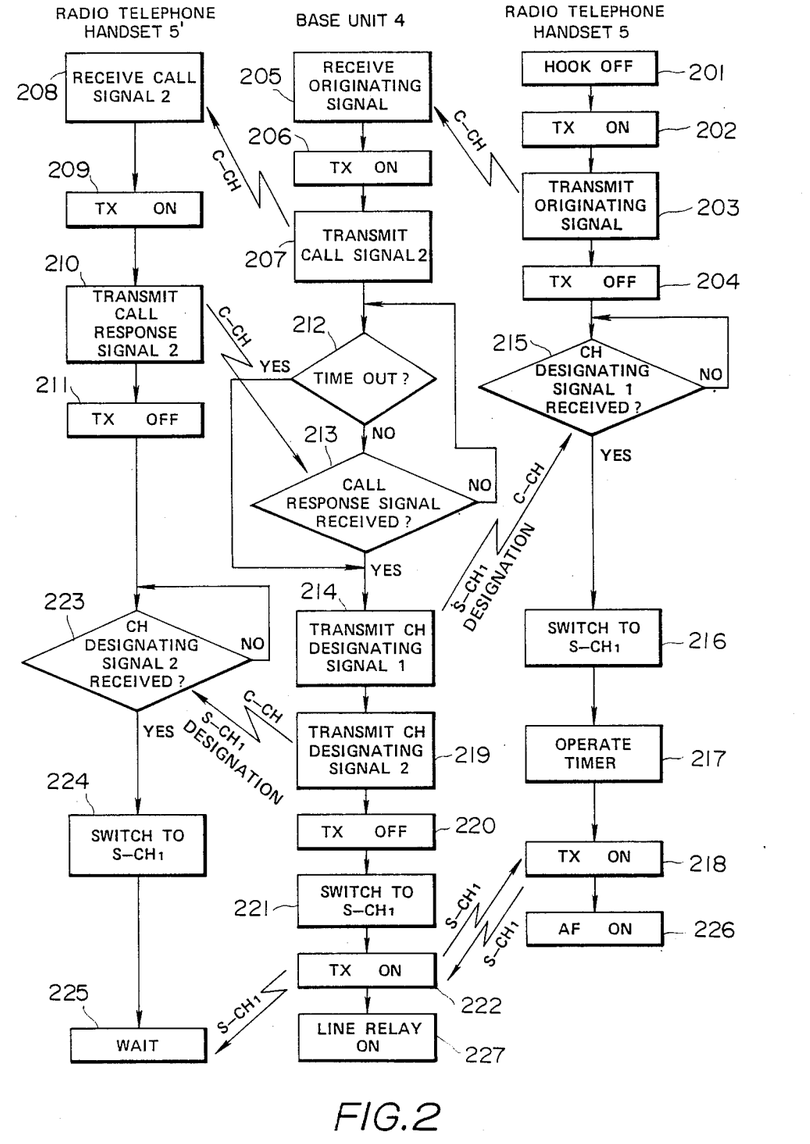
FIGS. 2 through 6 show flow charts showing the operation of the embodiment shown in FIG. 1.

FIG. 2 shows a flow chart for the case when an origination is issued from radio telephone handset 5. At step 201, when the hook switch 7 of the radio telephone handset 5 is taken off hook at step 202, this state change is detected by control unit 9 and this unit 9 turns ON the transmitter 8, and then at step 203 the originating signal is sent to the base unit 4 via antenna duplexer 10 and antenna 11. The transmission of the originating signal from the radio telephone handset 5 to the base unit 4 is made by using the control channel (C-CH). Upon termination of the transmission of the originating signal, at step 204, the control unit 9 turns off the transmitter 8. At step 205, the base unit 4 receives with receiver 14 the originating signal via antenna 12 and antenna duplexer 13 and the demodulated output from the receiver 14 is applied to the control unit 15. Then at step 206, the control unit 15 turns ON transmitter 16 for transmitting a call signal to radio telephone handset 5′ at step 207. The transmission of the call signal from the base unit 4 to the radio telephone handset 5′ is performed by using the control channel (C-CH). For the purpose of selectively sending the call signal to the radio telephone handset 5′, identifying information is incorporated into the call signal stored in the ROM 18′. When the radio telephone handset 5′ receives the call signal, it compares the identifying signal contained in the call signal with the information stored in ROM 17′, and when they coincide with each other, the radio telephone handset 5′ accepts the call signal. In the following, a digit '2' shows a signal containing the identifying signal stored in ROM 18′, while a digit '1' shows a signal containing an identifying signal stored in ROM 18. An identifying signal stored in ROMs 18, 18′, 17 and 17′ is made up of an identifying code common to both radio telephone handsets 5 and 5′ and individual identifying codes assigned to respective radio telephone handsets 5 and 5′. The common identifying code is used to identify the other radio telephone handset.

At step 208, the radio telephone handset 5′ receives a call signal 2 transmitted from the base unit 4 by receiver 19′ through antenna 11′ and antenna duplexer 10′. The demodulated output from receiver 19′ is supplied to control unit 9′ whereby it turns ON transmitter 8′ at step 209, and a call response signal 2 is sent to the base unit 4 at step 210. As has been pointed out before, the call response signal 2 contains an identifying signal stored in ROM 17′. Upon termination of the call response signal 2, at step 211, the control unit 9′ of the radio telephone system 5′ turns OFF transmitter 8′.

After sending the call signal 2 at step 207, at step 212 the base unit 4 executes a judgement as to whether a predetermined time has elapsed or not. When the result of the judgement shows that the predetermined time has not yet elapsed, that is not-time out, the program is transferred to step 213 at which a judgement is made as to whether receiver 14 has received a call response signal 2 from radio telephone handset 5′ or not. When the result of judgement at step 213 is NO, the program is returned to step 312. When result of judgement at step 212 shows a time out and when the result of judgement at step 213 shows receipt of a call response signal 2, the program is transferred to step 214. More particularly, when a predetermined time has elapsed after sending out a call signal 2 from the base unit 4, or when a call response signal 2 is received from radio telephone handset 5′, the program is transferred to step 214.

At step 214, a channel designating signal 1 for designating a predetermined channel is transmitted to radio telephone handset 5 by using the control channel. At step 215, the radio telephone handset 5 executes a judgement as to whether the radio telephone handset 5 has received the channel designating signal 1 or not. When the result of judgement is YES, the control unit 9 controls the synthesizer 20 for switching the radio frequency of transmitter 8 and receiver 19 to that corresponding to a predetermined speech channel (S-CH$_1$) at step 216. After that, at step 217 a timer is operated and after a predetermined time, the transmitter 8 is turned ON at step 218.

Following the transmission of the channel designating signal at step 214, at step 219, the base unit 4 sends out a channel designating signal 2 to radio telephone handset 5′ by using the control channel. The channel designating signal 2 designates the same speech channel as the channel designating signal 1. Upon completion of the transmission of the channel designating signal, at step 220, the base unit 4 turns OFF transmitter 16 so as to control the synthesizer 21, thereby switching the transmission/reception frequency to that corresponding to speech channel (S-CH$_1$) and then turning ON transmitter 16 at step 222. As a consequence, speech between the base unit and the radio telephone handset 5 becomes possible by utilizing the speech channel (S-CH$_1$).

At step 223, in radio telephone handset 5′ a judgement is made as to whether the channel designating signal 2 sent from the base unit 4 has been received or not. When the result of judgement executed at step 223 is YES, the program is advanced to step 224 at which the transmission/reception frequency is switched to that corresponding to speech channel (S-CH$_1$) and at step 2, the state is changed to a waiting state. Under this state since the transmitter 8′ at the radio telephone handset 5′ is OFF, the radio telephone handset 5′ can receive only a signal from the base unit 4 utilizing speech channel (S-CH$_1$).

After turning ON the transmitter 8 at step 218, the radio telephone handset 5 turns ON the audio frequency circuit of the transmitter 8 and receiver 19 at step 226. At step 222, the base unit turns ON transmitter 16 and the turns ON line relay 23 at step 227 for closing a relay contact, whereby radio telephone handset 5 can establish voice communication through a wired telephone line connected to terminal 3 of the base unit 4 by using a handset speaker 29 and microphone 30. In this state, when the hook switch 7' of the radio telephone handset 5' now in the waiting state is hooked OFF, the reception of speech is possible but transmission thereof is impossible.

The operation of a case wherein a ring signal is received by the base unit from the wired telephone line will be described as follows.

Figure 3:
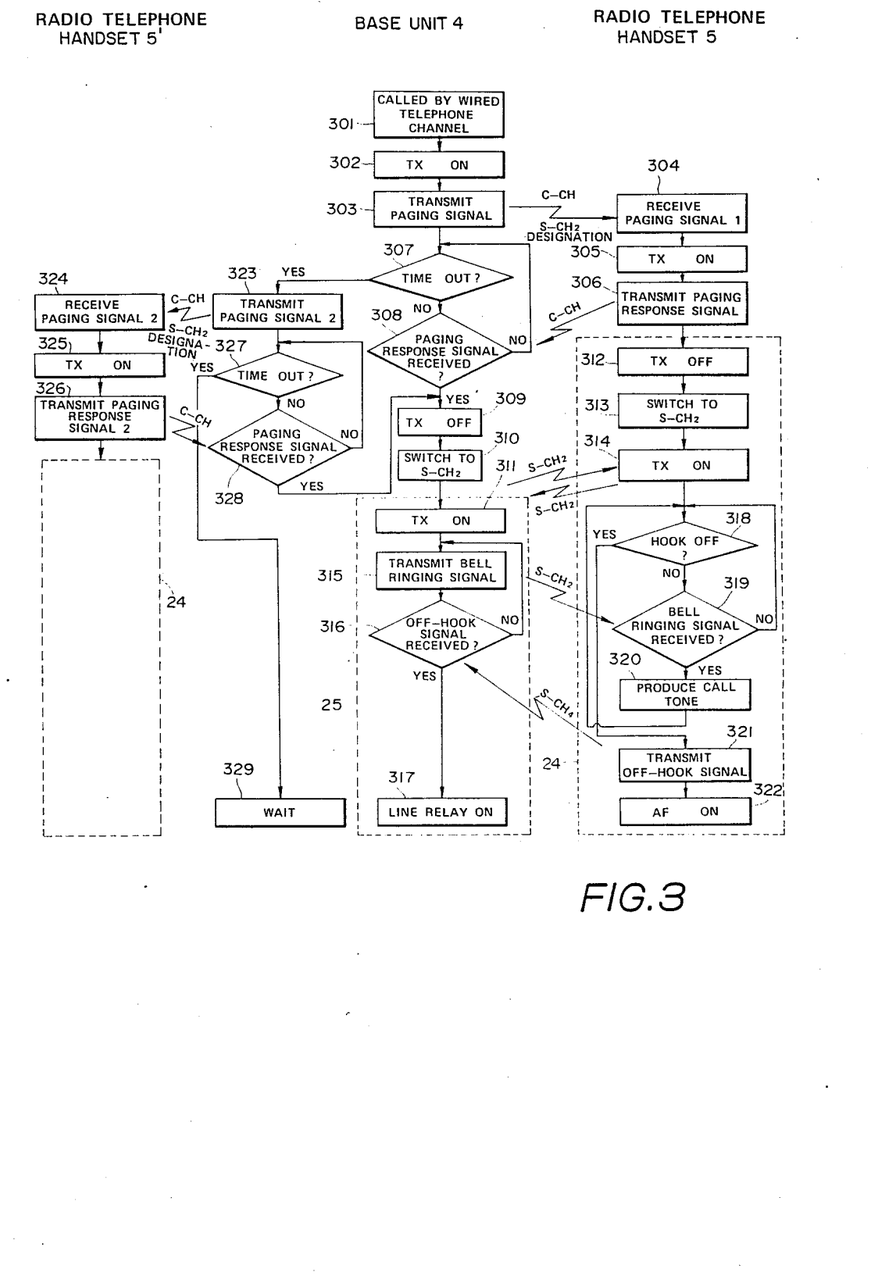

FIG. 3 shows a flow chart showing the operation of a case in which a ring signal is received by the base unit from a wired telephone line. The detection of the ring signal is made by judging the presence or absence of the ring signal by the control unit 15 based on the output signal of a detecting circuit, not shown, connected to the wired telephone line. At step 301, when a ring signal is received by the base unit, in other words, when the same is called by the wired telephone line, at step 302 the base unit turns ON the transmitter 16 so as to send out a paging signal containing a designating signal that designates a predetermined speech channel at step 303. The paging signals are sent to respective radio telephone handsets in a predetermined order of priority which is determined by the order of inserting IC sockets into ROMs 18 and 18' or by the order of information prestored in ROMs 18 and 18'. The order of priority may be set by an independent switch or the like, or may be randomly set by generating a suitable random number. Further, the order of priority can be set according to the hysteresis of the connection to the wired telephone line. Thus, for example, the most recently used radio telephone handset or a radio telephone handset most frequently used can be set to the upper most order.

In the flow chart shown in FIG. 3, the radio telephone handset 5 is a higher order of priority than the radio telephone handset 5'. Thus, at step 303, a paging signal 1 is sent to radio telephone handset 5. At step 304, when the radio telephone handset 5 receives the paging signal 1, transmitter 8 is turned ON at step 305, and a paging response signal 1 is sent to the base unit at step 306.

The base unit 4 monitors the paging response signal 1. When the paging signal is received within a predetermined interval after sending out the paging signal 1 at step 303, more particularly, at step 307, when it is judged that there is no time out, and at step 308, when it is judged that the paging response signal 1 has been received, the program is transferred to step 309 for turning OFF receiver 16. Then at step 310, a radio channel is switched to a speech channel (S-CH$_2$). After that at step 311, the transmitter 16 is turned ON.

At step 306, upon termination of the transmission of the paging response signal 1, at step 312, the radio telephone handset 5 turns OFF transmitter 8 to switch the radio channel to the speech channel (S-CH$_2$). After that, at step 314, transmitter 8 is turned ON again, thereby establishing a speech channel between base unit and radio telephone handset 5 by utilizing the speech channel (S-CH$_2$).

At step 311, the base unit turns ON transmitter 16 and then at step 315, the base unit sends out a bell ringing signal by using the speech channel (S-CH$_2$). At step 319 as the radio telephone handset 5 receives the bell ringing signal, at step 320, a call tone is produced from loudspeaker 31. At step 318 when the hook switch 7 is taken off hook in response to the call tone, at step 321, an off-hook signal is sent to the base unit 4 through the speech channel (S-CH$_2$). Then at step 322, the audio frequency circuit is turned ON.

At step 316 when the base unit receives the off-hook signal from the radio telephone handset, at step 317, the line relay 23 is turned ON, whereby the radio telephone handset 5 can exchange speech with a wired telephone line through the base unit 4.

At step 307, when time out is judged, that is where a paging response signal 1 is not returned from the radio telephone handset after elapse of a predetermined interval, after sending out of the paging signal, at step 323 a paging signal 2 for the radio telephone handset at the next order of priority is sent out. At step 324, when the radio telephone handset 5' receives the paging signal 2, at step 325, the transmitter 8' is turned ON to send out the paging response signal 2 at step 326. When this paging response signal 2 is received by the base unit 4 within a predetermined interval after sending out the paging signal 2, the program is transferred to step 309 at which the transmitter 16 is turned OFF, and then the channel is switched to a speech channel (S-CH$_2$), whereby the transmitter 16 is turned ON again to send out a bell ringing signal at step 315.

After sending out the paging response signal 2, the radio telephone handset 5' causes the radio telephone handset 5 to execute the operations, that is, a portion 24 of the flow chart bounded by dotted lines. More particularly, transmitter 8' is turned OFF first for switching the speech channel (S-CH$_2$) and turning ON again the transmitter 8'. When a bell ringing signal is received from the base unit, a call tone is sent out. When the hook switch 7' is opened in response to the call tone, an off-hook signal is sent out and then the audio frequency circuit is turned ON.

At step 316, when the base unit receives an off-hook signal from radio telephone handset 5', at step 317, the line relay 23 is turned ON so as to connect the radio telephone handset 5' to the wired telephone line via the base unit 4.

At step 307, when time out is judged, that is where a paging response signal 1 is not returned from the radio telephone handset after a predetermined time interval, after sending out of the paging signal, at step 323 a paging signal 2 for the radio telephone handset at the next order of priority is sent out. At step 324, when the radio telephone handset 5' receives the paging signal 2, at step 325, the transmitter 8' is turned ON to send out the paging response signal 2 at step 326. When this paging response signal 2 is received by the base unit 4 within a predetermined interval after sending out the paging signal 2, the program is transferred to step 309 at which the transmitter 16 is turned OFF, and then the channel is switched to speech channel (S-CH$_2$), whereby the transmitter 16 is turned ON again to send out a bell ringing signal at step 315.

After sending out the paging response signal 2, the radio telephone handset 5' executes the same operations as the radio telephone handset 5 with respect to a portion 24 of the flow chart bounded by dotted lines. More particularly, transmitter 8' is turned OFF first for switching the channel to the speech channel (S-CH$_2$) and turning ON again the transmitter 8'. When a bell ringing signal is received from the base unit, a call tone is sent out. When the hook switch 7' is taken off-hook in response to the call tone, an off-hook signal is sent out and then the audio frequency circuit is turned ON.

At step 316, when the base unit receives an off-hook signal from radio telephone handset 5', at step 317, the line relay is turned ON so as to connect the radio telephone handset 5' to the wired telephone line via the base unit.

When the time out is judged at step 327, that is when no paging response signal 2 is sent back from radio telephone handset in a predetermined interval even though a paging signal 2 has been sent out, the program is transferred to step 329, thus bringing the base unit to the waiting state.

Figure 4:
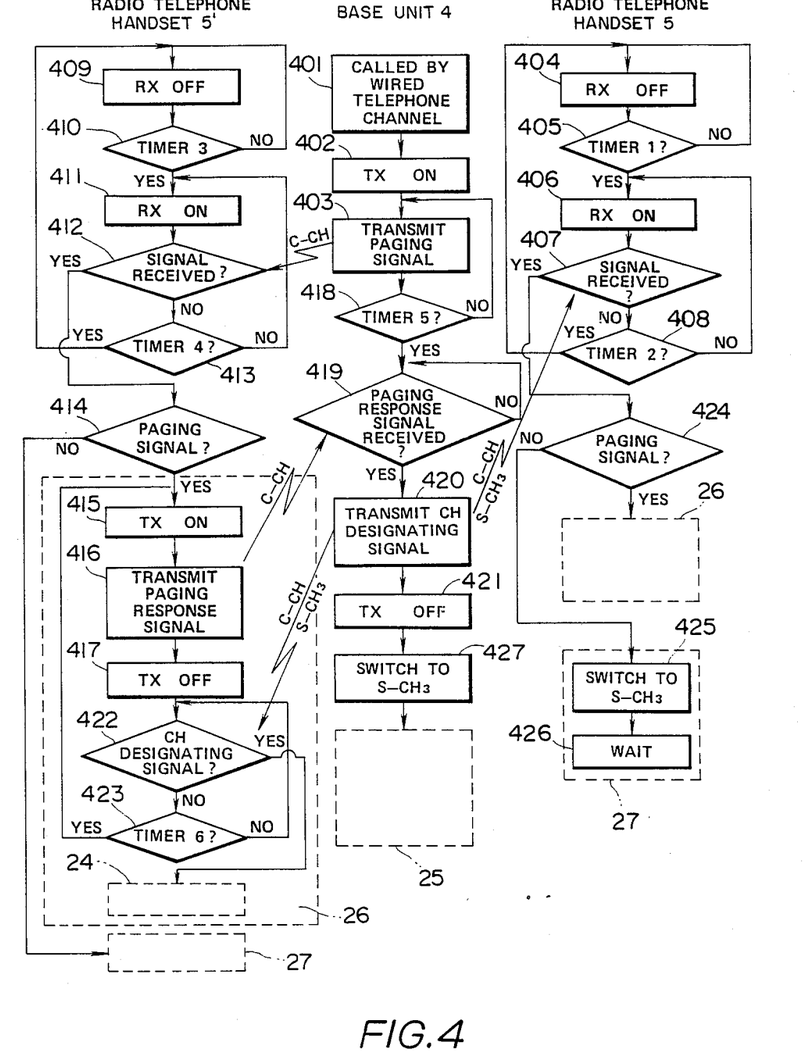

FIG. 4 shows another flow chart in a case where a ring signal is received by the base unit from a wired telephone line. As can be noted from this flow chart, radio telephone handsets 5 and 5' intermittently receive signals at different periods and the base unit sends a paging signal containing only the common identifying code. When either one of the radio telephone handsets 5 and 5' (in the flow chart telephone handset 5') respond to the paging signal, both radio telephone handsets 5 and 5' are connected to the predetermined speech channel (S-CH$_2$) so as to cause the telephone handset 5' to generate a call tone and the telephone handset 5' which went off-hook in response to the call tone is connected to the wired telephone line, whereas the radio telephone handset 5 is brought to the waiting state.

At step 401 when there is a ring signal on the wired line, at step 402, the base unit 4 turns ON transmitter 16 for transmitting a paging signal over the control channel (C-CH) at step 403. As above described, the paging signal contains only the common identifying code.

In a condition when radio telephone handsets 5 and 5' do not receive any signal, they intermittently receive the signal at a predetermined period (battery saving operation). More particularly, at step 404, radio telephone handset 5 turns OFF receiver 19 and as the set time of the timer 1 elapses it turns ON receiver 19 at step 405. On the other hand, at step 407 where there is no received signal and the set time of timer 2 has elapsed at step 408, the receiver 19 is turned OFF again. In the same manner, at step 409 radio telephone handset 5' turns OFF receiver 19'; and as the set time of time 3 has elapsed at step 410, the receiver 19' is turned ON. At step 412 where there is no signal received, and at step 413 the set time of timer 4 has elapsed, the receiver 19' is turned OFF again.

Suppose now that a paging signal transmitted from base unit 4 at step 403 is received by radio telephone handset 5' and that the receipt of the signal is judged at step 412. In this case, the program is transferred to step 414 so as to make a judgement as to whether the received signal is a paging signal or not. When the signal is the paging signal, at step 415, transmitter 8' is turned ON for sending out a paging response signal at step 416 and for turning OFF the transmitter 417 at step 417. When the paging response signal is received by the base unit 4 at step 419 in a predetermined interval after sending out the paging signal at step 403, the base unit 4 sends out a channel designating signal that designates a predetermined speech channel at step 420. After that, at step 421, transmitter 16 is turned OFF. When the radio telephone handset 5 receives the channel designating signal at step 423 in a predetermined interval after sending out the paging response signal at step 416, and when the received signal is judged as the channel designating signal at step 422, the program is transferred to the flow chart shown by dotted line block 24. This flow chart is the same as the flow chart in block 24 shown in FIG. 3.

At step 407, the channel designating signal transmitted from the base unit 4 is judged by radio telephone handset 5 at step 407, and then the program is transferred to step 424. In this case, since the signal is not the paging signal, after switching the channel to speech channel (S-CH$_3$) at step 425, and the telephone handset is brought the waiting state at step 426.

At step 421, after turning OFF transmitter 16, the base unit switches the channel to the speech channel (S-CH$_3$) at step 427 and then the program is transferred to the flow chart shown by block 25. The flow chart shown by this block 25 is the flow chart shown by block 25 in FIG. 3. In FIG. 4, two flow charts shown by each of blocks 26 and 27 are the same, respectively.

Figure 5:
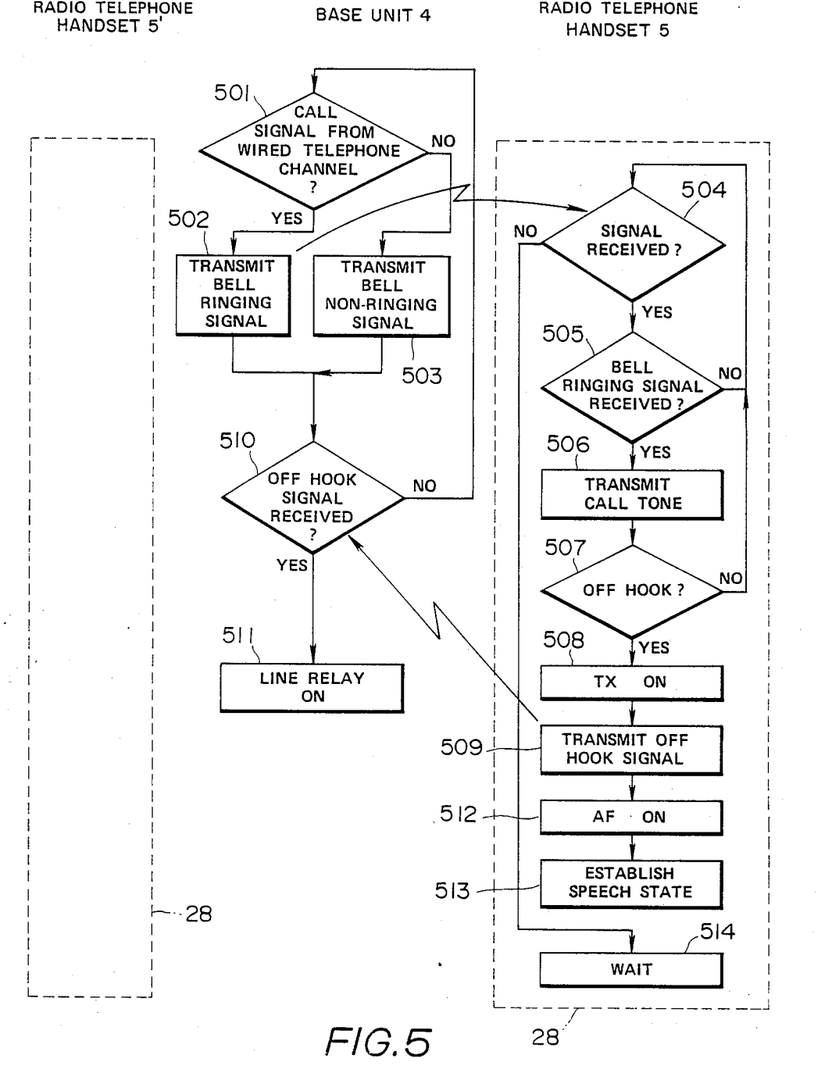

FIG. 5 shows a flow chart where a ring signal is received from the wired telephone line. The flow chart shown in FIG. 5 is a flow chart after the base unit 4 and the radio telephone handsets 5 and 5' are connected to the same speech channel in the same manner as the flow chart shown in FIG. 4. At step 501, the base unit 4 judges as to whether there is a ring signal from the wired telephone line. When it is judged that there is a ring signal, at step 502, a bell not ringing signal is sent out, whereas when it is judged that there is no ring signal, at step 503, a bell ringing signal is sent out. Whether the bell ringing signal is received or not is judged by radio telephone handset 5, for example at step 504.

At step 505, when it is judged that the received signal is the bell ringing signal, a call tone signal is sent out at step 506, and the hook switch 7 is hooked OFF at step 507 in response to the call tone. Then transmitter 8 is turned ON at step 508 to send out an off-hook signal at step 509 which is received by base unit 4 at step 510, whereby the base unit 4 turns ON the line relay 23 at step 511. At step 509, after sending out the off-hook signal, the radio telephone handset 5 turns ON the audio frequency circuit at step 512, thus establishing a speech state at step 513.

At step 505, when it is judged that the bell ringing signal is not received, and at step 507, when it is judged that the hook switch is ON at step 507, that is when it is judged that the hook switch is not OFF, that program is returned to step 504. At step 510, when it is judged that an OFF hook signal is not yet received, the program is returned to step 501. At step 504, when it is judged that no signal is received, the program is returned to step 514 to bring the state to the waiting state. More particularly, with the flow chart shown in FIG. 5, when there is a ring signal through a wired telephone line, both radio telephone handsets 5 and 5' generate a call tone signal so that the first radio telephone handset establishes speech state, while the other radio telephone handset reverts to the waiting state because there is no signal received. In this case, by using only the bell ringing signal, the circuit is reverts to the waiting state when the bell ringing signal does not arrive for a predetermined interval.

Figure 6:
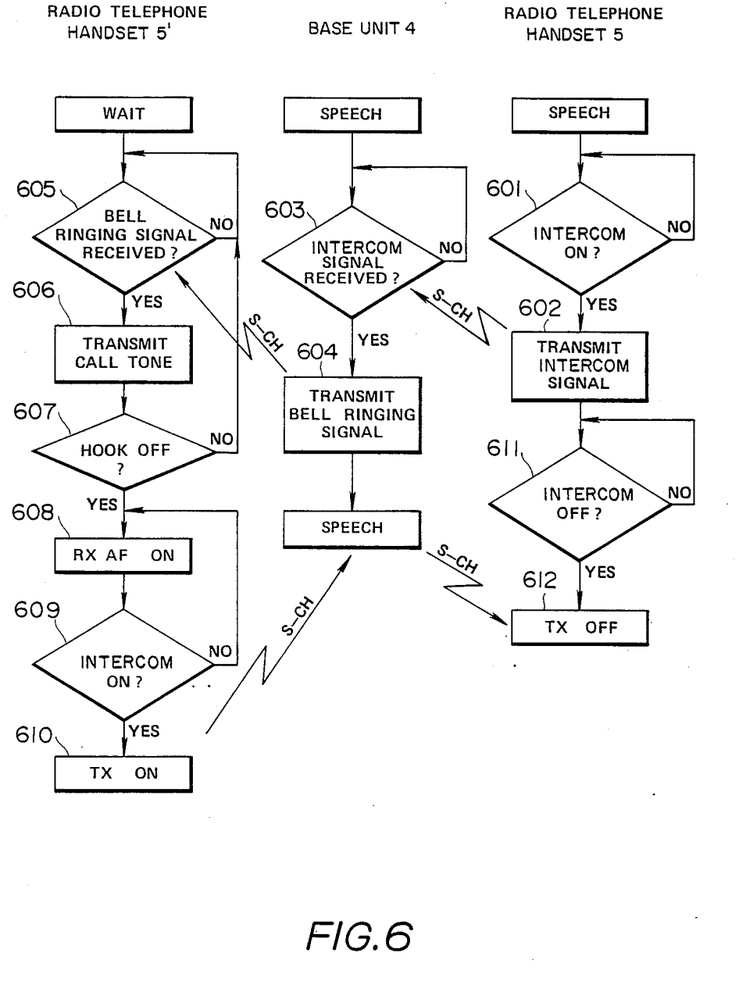

FIG. 6 is a flow chart useful to explain the intercom operation between the radio telephone handsets of the radio telephone system according to this invention. Suppose now that radio telephone handset is in a speech mode while the other radio telephone handset 5' is in the waiting state. In this state, when intercom switch 32 of the radio telephone handset 5 is turned ON at step 601, the radio telephone handset 5 sends out an intercom signal by using a speech channel at step 602. At step 603, when the base unit 4 receives this intercom signal, at step 604, the base unit 4 sends out the bell ringing signal through the speech channel. At step 605, when the radio telephone handset 5' receives the bell ringing signal, the telephone handset 5' sends out the call tone signal and when this radio telephone handset goes off-hook in response to the call tone signal at step 607 and the audio frequency circuit of receiver 19' is turned ON at step 608, so that the radio telephone handset 5' is receiving signals. On the other hand, the radio telephone handset 5 can make speech while the intercom switch 32 is ON. Under this state, when the intercom switch 32' of the telephone handset 5' is turned ON at step 609, the transmitter 8' of the radio telephone handset 5' is turned ON at step 610, whereby the radio telephone handset 5' can exchange speech. When the intercom switch 32 is turned OFF at step 611, the transmitter 8 of the radio telephone handset 5 is turned OFF at step 612, thus enabling only reception. In such an intercom state, unidirectional speech between radio telephone handsets 5 and 5' becomes possible by using intercom switches 32 and 32' as press-to-talk switches.

When a system shown in FIG. 5 is adopted by using the intercom signal as a transfer signal, transfer of signals from radio telephone handset 5 to radio telephone handset becomes possible. When the transfer is made possible as above described, a special ringing tone may be issued that representing the transfer of the signal. It is possible to provide private speech by providing a private speech button switch. By operating this switch reception by a radio telephone handset other than the radio telephone handset capable of effecting bidirectional speech.

What is claimed is:

1. A control system for a radio telephone apparatus comprising:
   a plurality of radio telephone handsets, each having a radio transmitter and a radio receiver;
   a base unit having a radio transmitter and a radio receiver, connected to a wired telephone line, and connected to said radio telephone handsets by a radio channel;
   means for designating a first radio channel for said plurality of radio telephone handsets in response to a ring signal on said telephone line;
   means for establishing a speech radio channel between said radio telephone sets and said base unit; and
   intercom switch means, having an intercom switch, in each of said radio telephone handsets for turning OFF the transmitter of a respective one of said radio telephone handsets when said intercom switch means is OFF, and for turning ON the transmitter of the respective one of said radio telephone handsets when said intercom switch is turned ON.

2. The control system of claim 1 wherein said means for establishing a speech radio channel includes:
   means in said base unit for detecting a ring signal on said wired telephone line;
   means for sequentially sending, with a predetermined time difference, a paging signal on said first radio channel including a channel designating signal to said plurality of radio telephone handsets from said base unit when said ring signal is detected;
   means for sending a paging response signal to said base unit from a responding one of said radio telephone handsets when said ring signal is received;
   means for switching a radio channel of said responding radio telephone handset to a speech radio channel designated by said channel designating signal; and
   means for switching the radio channel of said base unit to a speech radio channel designated by said channel designating signal, when said paging response signal is received by said base unit within a predetermined time interval after sending out said paging signal from said base unit.

3. The control system of claim 2 wherein said paging signal is sequentially sent out to said plurality of radio telephone handsets from said base unit according to a predetermined order of priority.

4. The control system of claim 2 wherein said paging signal is sequentially sent out to said plurality of radio telephone handsets from said base unit according to a randomly set order of priority for each detection of said paging signal.

5. The control system of claim 2 wherein said paging signal is sequentially sent to said plurality of radio telephone handsets from said base unit according to a predetermined order of priority which is set according to a speech hysteresis of respective radio telephone handsets.

6. The control system of claim 5 wherein said order of priority is set such that a last one of said radio telephone handsets to transmit has the highest priority.

7. The control system of claim 2 wherein said means for establishing a speech radio channel includes:
   means for sending a bell ringing signal to said radio telephone handset from said base unit after said base unit has been switched to a speech radio channel designated by said channel designating signal;
   means in said responding one of said radio telephone handsets for producing an audible call tone in response to said bell ringing signal; and
   means for sending an off-hook signal to said base unit from said responding one of said radio telephone handsets when said responding one of said radio telephone handsets is taken Off hook, thereby interconnecting said wired telephone line and said responding one of said radio telephone handsets.

8. The control system of claim 7 wherein said bell ringing signal is sent to all of said radio telephone handsets.

9. The control system of claim 2 wherein said means for establishing a speech radio channel includes:
   means for sending a bell ringing signal to a selected one of said radio telephone handsets from said base unit when said ring signal is detected and for sending a bell-not-ringing signal when said ring signal is not detected after said base unit has been switched to said speech radio channel;
   means in said selected radio telephone handset for producing an audible call tone in response to said bell ringing signal;
   means responsive to said call tone for sending an off-hook signal to said base unit from said selected radio telephone handset when said selected radio telephone handset is taken OFF hook; and
   means for resetting said telephone apparatus to a waiting state when said selected radio telephone set does not receive either said bell ringing signal or said bell-not-ringing signal, so as to interconnect said wired telephone line with said selected radio telephone set.

10. The control system of claim 1 further comprising:
    means in said base unit for detecting a ring signal on said wired telephone line;

means for sending a paging signal to said plurality of radio telephone handsets from said base unit when said ring signal is detected by said detecting means;

means for sending a paging response signal to the said base unit from said radio telephone handsets in response to said paging signal;

means responsive to said paging response signal for sending a channel designating signal to said radio telephone handsets;

means for switching a radio channel of said base unit to a speech radio channel designated by said channel designating signal; and means responsive to said channel designating signal for switching the radio channel of said radio telephone handsets to a speech radio channel corresponding to said channel designating signal.

11. The control system of claim 10 wherein said means for sending a channel designating signal from said base unit includes means for sending said channel designating signal to all of said radio telephone handsets so as to switch the radio channels of all of said radio telephone handsets to a speech radio channel designated by said channel designating signal.

12. The control system of claim 10 wherein said means for establishing a speech radio channel includes:
means for sending a bell ringing signal to said radio telephone handsets from said base unit after the radio channel of said base unit has been switched to a speech radio channel designated by said channel designating signal;
means in said radio telephone handsets for producing a call tone in response to said bell ringing signal; and
means for sending an off-hook signal to said base station from said radio telephone handsets when said radio telephone handsets are taken off hook in response to said call tone, thus interconnecting said wired telephone line with a first one of said radio telephone handsets to send out an off-hook signal.

13. The control system of claim 10 wherein said means for establishing a speech radio channel includes:
means for sending a bell ringing signal to said radio telephone handsets from said base unit when a ring signal is detected on said wired telephone line and for sending a bell-not-ringing signal when said ring signal is not detected after a radio channel of said base unit has been switched to a speech radio channel designated by said channel designating signal;
means in said radio telephone handsets for producing an audible call tone in response to said bell ringing signal;
means for sending an off-hook signal to said base unit from said radio telephone handsets when said radio telephone handsets are taken Off hook in response to said call tone; and
means for resetting the telephone apparatus to a waiting state when said radio telephone handsets do not receive either said bell ringing signal or said bell-not-ringing signal, thereby interconnecting said wired telephone line and a one of said radio telephone handsets which has sent out an off-hook signal.

14. The control system of claim 1 wherein said means for establishing a speech radio channel includes:
means in each of said radio telephone handsets for sending a call origination signal;
means in said base unit, responsive to said origination signal, for sending a channel designating signal to a one of said radio telephone handsets sending an originating signal;
means for switching a radio channel of said base unit to a speech radio channel designated by said channel designating signal; and
means responsive to said channel designating signal for switching the radio channel of said originating radio telephone set to a speech radio channel designated by said channel designating signal.

15. The control system of claim 14 wherein said means for sending a channel designating signal includes means for sending said channel designating signal to all of said radio telephone handsets, to switch the radio channels of all of said radio telephone handsets to a speech radio channel designated by said channel designating signal.

16. The control system of claim 14 wherein said means for sending a channel designating signal includes means for sending said channel designating signal to only said originating radio telephone handset from said base unit, and only the radio channel of said originating radio telephone handset is switched to a speech radio channel designated by said channel designating signal.

17. The control system of claim 14 further comprising:
means responsive to said originating signal for sending a call signal from said base unit to a selected one of said radio telephone handsets other than said originating radio telephone handset; and
means responsive to said call signal for sending a call response signal to said base unit from said selected one of said radio telephone handsets.

18. The control system of claim 17 wherein said means for sending a channel designating signal includes means for sending a channel designating signal to a one of said radio telephone handsets after a call response signal from said one of said radio telephone handsets has been confirmed in response to said call signal.

19. The control system of claim 17 wherein said means for sending a channel designating signal includes means for sending a channel designating signal when a call response signal sent from a selected one of said radio telephone handsets has not been confirmed in response to said call signal.

20. The control system of claim 1 further comprising:
means for sending an intercom signal to said base unit from one of said radio telephone handsets in response to an ON operation of said intercom switch;
means responsive to receipt of an intercom signal for sending a bell ringing signal to an addressed one of said radio telephone handsets from said base unit;
means in said addressed radio telephone handset for generating an audible call tone in response to said bell ringing signal; and
means for enabling said transmitter of said addressed radio telephone set when said addressed radio telephone set is taken off hook in response to said call tone.

21. A control system for a radio telephone apparatus comprising:
a base unit having a radio transmitter and a radio receiver, and connected to a wired telephone line;
a plurality of radio telephone handsets, each having a radio transmitter and a radio receiver, and each being connected to said base unit through a radio channel;
means in said base unit for designating a first radio channel for said plurality of radio telephone handsets when a ring signal is received from said wired telephone line, and for establishing a speech radio channel among said plurality of radio telephone handsets and said base unit;

intercom switch means provided for each of said radio telephone handsets; and means for exchanging speech among said radio telephone handsets in response to the operation of said intercom switch means.

* * * * *

UNITED STATES PATENT AND TRADEMARK OFFICE
CERTIFICATE OF CORRECTION

PATENT NO. : 4,897,864

DATED : January 30, 1990

INVENTOR(S) : Yoshitoshi Murata et al

It is certified that error appears in the above-identified patent and that said Letters Patent is hereby corrected as shown below:

Claim 19, Column 12, Line 41, "signal" should be followed by --a predetermined interval after sending out said call signal--.

Signed and Sealed this

Fourteenth Day of July, 1992

Attest:

DOUGLAS B. COMER

Attesting Officer

Acting Commissioner of Patents and Trademarks